US009924370B2

(12) United States Patent
Cai et al.

(10) Patent No.: US 9,924,370 B2
(45) Date of Patent: Mar. 20, 2018

(54) POLICY CONTROL FOR TRANSMISSIONS ON THE UNLICENSED SPECTRUM

(71) Applicant: Alcatel-Lucent USA Inc., Murray Hill, NJ (US)

(72) Inventors: Yigang Cai, Naperville, IL (US); Suzann Hua, Walnut Creek, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 25 days.

(21) Appl. No.: 15/139,234

(22) Filed: Apr. 26, 2016

(65) Prior Publication Data
US 2017/0311169 A1  Oct. 26, 2017

(51) Int. Cl.
*H04W 16/14* (2009.01)
*H04W 72/04* (2009.01)
*H04L 5/00* (2006.01)
*H04L 27/00* (2006.01)
*H04M 15/00* (2006.01)

(52) U.S. Cl.
CPC ............ *H04W 16/14* (2013.01); *H04L 5/001* (2013.01); *H04L 5/003* (2013.01); *H04L 5/0058* (2013.01); *H04L 27/0006* (2013.01); *H04W 72/0493* (2013.01); *H04M 15/66* (2013.01)

(58) Field of Classification Search
CPC ... H04W 36/14; H04W 36/385; H04W 36/18; H04W 84/12; H04W 16/14
USPC ... 455/454, 428, 434, 436, 456.5, 41.1–41.2
See application file for complete search history.

(56) References Cited

U.S. PATENT DOCUMENTS

| 2012/0030331 | A1  | 2/2012 | Karampatsis |
| 2014/0043979 | A1  | 2/2014 | Etemad et al. |
| 2014/0211616 | A1* | 7/2014 | Salot ................ H04L 47/10 370/230 |
| 2015/0036495 | A1* | 2/2015 | Venkatachalam . H04W 28/0215 370/235 |

(Continued)

FOREIGN PATENT DOCUMENTS

GB  2498749 A  7/2013

OTHER PUBLICATIONS

Calhoun, P., Diameter Base Protocol, Network Working Group, RFC 3588, Sep. 2003.

(Continued)

*Primary Examiner* — Cong Tran
(74) *Attorney, Agent, or Firm* — Duft Bornsen & Fettig, LLP

(57) ABSTRACT

Systems, methods, and software for controlling transmissions of User Equipment (UE) on an unlicensed spectrum. In one embodiment, a base station communicates with the UE through radio communications on a licensed spectrum of a carrier. The base station transmits a query to a policy control element requesting spectrum selection criteria for the UE over a direct interface. The base station receives a response from the policy control element that includes the spectrum selection criteria for the UE, and processes the spectrum selection criteria to allocate resources for transmissions involving the UE on the licensed spectrum and on the unlicensed spectrum. The base station then provides a control message including the allocated resources towards the UE to enable the UE to perform the transmissions on the unlicensed spectrum, the licensed spectrum, or a combination of the two.

26 Claims, 6 Drawing Sheets

(56) References Cited

U.S. PATENT DOCUMENTS

| | | | |
|---|---|---|---|
| 2015/0148030 A1* | 5/2015 | Seo | H04L 5/001 455/426.1 |
| 2016/0006883 A1 | 1/2016 | Cartmell | |
| 2017/0070923 A1* | 3/2017 | Li | H04W 36/0066 |
| 2017/0171782 A1* | 6/2017 | Mohamed | H04W 36/0022 |
| 2017/0187886 A1* | 6/2017 | Rashid | H04M 15/66 |

OTHER PUBLICATIONS

3rd Generation Partnership Project, Charging Data Record (CDR) Transfer, 3GPP TS 32.295, Version 12.0.0 (Sep. 2013).
3rd Generation Partnership Project, Charging Data Record (CDR) File Format and Transfer, 3GPP TS 32.297, Version 12.0.0 (Mar. 2014).
3rd Generation Partnership Project, Study on Licensed-Assisted Access to Unlicensed Spectrum, 3GPP TR 36.889, Version 13.0.0 (Jun. 2015).
3rd Generation Partnership Project, S1 general aspects and principles, 3GPP TS 36.410, Version 13.0.0 (Dec. 2015).
3rd Generation Partnership Project, Evolved Universal Terrestrial Radio Access (E-UTRA) and Evolved Universal Terrestrial Radio Access Network (E-UTRAN), 3GPP TS 36.300, Version 12.5.0 (Mar. 2015).
3rd Generation Partnership Project, Rx Interface and Rx/Gx signalling flows, 3GPP TS 29.211, Version 6.4.0 (Jun. 2007).
http://www.3gpp.org/technologies/keywords-acronyms/101-carrier-aggregation-explained.

\* cited by examiner

POLICY CONTROL FOR TRANSMISSIONS ON THE UNLICENSED SPECTRUM

FIELD OF THE INVENTION

The invention is related to the field of communication and, in particular, to using mobile phones in the unlicensed spectrum.

BACKGROUND

Service providers or carriers typically offer numerous voice and data services to end users of mobile phones or other mobile terminals. Some examples of voice services are voice calls, call forwarding, call waiting, etc. Some examples of data services are Internet access, streaming audio, streaming video, online gaming, Internet Protocol television (IP-TV), etc. A "carrier" is a term commonly used in the United States and Canada to refer to a company that provides these types of voice or data services. Examples of carriers include Verizon Wireless®, T-Mobile®, AT&T®, etc.

The first types of wireless or mobile networks that were introduced by carriers were First Generation (1G) and Second Generation (2G) networks. 1G networks provided voice services via analog signals, and then evolved into 2G networks that provided voice services via digital signals. Mobile communications then evolved into Third Generation (3G) (including 2.5G) networks that provided both voice services and data services. For example, 3G networks are able to provide wireless voice telephony, as well as data services such as Internet access, video calls, mobile TV, etc. Some of the 3G networks implemented by carriers were Universal Mobile Telecommunications System (UMTS) networks, Enhanced Voice Data Optimized (EV-DO) networks, General Packet Radio Service (GPRS) networks, etc. Carriers are now migrating their networks toward Fourth Generation (4G) technologies over Packet-Switched (PS) networks. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One project within the 3rd Generation Partnership Project (3GPP, 3GPP2) is the Long Term Evolution (LTE), which is a 4G technology. The network architecture defined by this project is referred to as the Evolved Packet System (EPS). The EPS architecture comprehends E-UTRAN (Evolved-UMTS Terrestrial Radio Access Network) on the radio access side and EPC (Evolved Packet Core) on the core side. Fifth Generation (5G) denotes the next major phase of mobile telecommunications standards beyond the current 4G standards.

E-UTRAN is the air interface of the LTE network, and comprises a plurality of base stations that are referred to as Enhanced NodeBs (eNodeBs). NodeB is a term used in UMTS to refer to a base station or cell site that interfaces a mobile device with a core network (similar to a base transceiver station (BTS) in a GSM network). The coverage area surrounding the base station is referred to as a "cell". An eNodeB is comprised of multiple cells or sectors, and is an enhanced base station that performs tasks similar to a nodeB in communicating with mobile devices.

Wireless technologies utilized by base stations use the airwaves to transmit and receive information. Because different technologies can use the airwaves simultaneously, the wireless or radio-frequency (RF) spectrum is segmented into frequency bands. Regulatory agencies, such as the Federal Communications Commission (FCC) in the United States, define a licensed spectrum where carriers are allowed to operate. A regulatory agency uses spectrum allocation to issue exclusive rights to carriers to operate within certain frequency bands on the licensed spectrum. Spectrum allocation ensures that carriers do not interfere with each other's transmissions.

Other frequency ranges in the RF spectrum is unlicensed, and is referred to as the "unlicensed spectrum". One example of the unlicensed spectrum is the 5 GHz band used by dual-band Wi-Fi equipment. Modern mobile phones have RF capabilities for communicating over the unlicensed spectrum in addition to the licensed spectrum of a carrier. Proposals have been made to provide carrier-grade wireless service on the unlicensed spectrum, such as LTE-U (LTE-Unlicensed), License Assisted Access (LAA), and LTE-WLAN Aggregation (LWA). The unlicensed spectrum can be used as a complement to the licensed spectrum to help carriers address the increased traffic on their networks. It is therefore desirable to effectively utilize the unlicensed spectrum for carrier-grade wireless services.

SUMMARY

Embodiments described herein provide policy control for selecting the licensed spectrum and/or the unlicensed spectrum for wireless services involving User Equipment (UE). A geographic area served by a carrier includes one or more base stations that operate on the licensed spectrum, and may include one or more wireless access points that operate on the unlicensed spectrum. The base station of a carrier is enhanced in the embodiments described herein to have a direct interface with a policy control element of the core network. The base station may therefore download user-specific criteria or preferences directly from the policy control element for selecting radio resources for transmissions of a mobile phone (i.e., UE). Based on the criteria, the base station selects the licensed spectrum and/or the unlicensed spectrum for the mobile phone to use for an active session (in a handover scenario) or for a future session when the mobile phone is in idle mode.

One embodiment is a base station of a radio access network that provides a UE access to a core network by operating on a licensed spectrum for a carrier. The base station includes a radio interface component configured to communicate with the UE through radio communications on the licensed spectrum. The base station further includes a network interface component configured to directly interface with a policy control element of the core network. The base station further includes a controller configured to transmit a query to the policy control element through the network interface component requesting spectrum selection criteria for the UE, and to receive a response from the policy control element through the network interface component that includes the spectrum selection criteria for the UE. The controller is configured to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation.

In another embodiment, the controller is configured to store the spectrum selection criteria for the UE in local memory, to start a validity timer, and to delete the spectrum selection criteria for the UE from the local memory upon expiration of the validity timer.

In another embodiment, the base station connects to at least one wireless access point that provides the UE access to the core network by operating on the unlicensed spectrum.

In another embodiment, the wireless access point comprises a WiFi access point.

In another embodiment, the base station comprises an eNodeB of an Evolved Universal Terrestrial Radio Access Network (E-UTRAN).

In another embodiment, the policy control element comprises a Policy and Charging Rules Function (PCRF) of the core network, and the base station directly interfaces with the PCRF using a Gx interface.

In another embodiment, the Gx interface is enhanced with a Coexistence-Criteria Attribute Value Pair (AVP) for criteria used in load balancing among different spectrum carriers.

In another embodiment, the Gx interface is enhanced with a Low-Interference-Criteria Attribute Value Pair (AVP) for criteria used in selecting carriers with the lowest interference.

In another embodiment, the Gx interface is enhanced with a Traffic-Criteria Attribute Value Pair (AVP) for criteria used in allocating resources for transmissions involving the UE on the licensed spectrum and the unlicensed spectrum based on traffic over at least one of the licensed spectrum and the unlicensed spectrum.

In another embodiment, the Gx interface is enhanced with a Time-Criteria Attribute Value Pair (AVP) for criteria used in allocating resources for transmissions involving the UE on the licensed spectrum and on the unlicensed spectrum based on time of day or day of the week.

In another embodiment, the Gx interface is enhanced with a Smart-Pricing-Criteria Value Pair (AVP) for criteria used in allocating resources for transmissions involving the UE on the licensed spectrum and on the unlicensed spectrum based on cost of transmissions over the licensed spectrum or the unlicensed spectrum.

Another embodiment comprises a method for providing policy control for transmissions on an unlicensed spectrum with a base station of a radio access network that provides a UE access to a core network by operating on a licensed spectrum for a carrier. The method includes transmitting a query from the base station to a policy control element of the core network requesting spectrum selection criteria for the UE, where the base station is configured to directly interface with the policy control element. The method further includes receiving a response from the policy control element in the base station that includes the spectrum selection criteria for the UE, processing the spectrum selection criteria to allocate resources for transmissions involving the UE on the licensed spectrum and on the unlicensed spectrum, and providing a control message including the allocated resources from the base station toward the UE to enable the UE to perform the transmissions on the unlicensed spectrum, the licensed spectrum, or a combination of the unlicensed spectrum and the licensed spectrum based on the allocation.

Another embodiment comprises a non-transitory computer readable medium embodying programmed instructions executed by a processor of a base station of a radio access network that provides a UE access to a core network by operating on a licensed spectrum for a carrier. The instructions direct the processor to transmit a query to a policy control element of the core network requesting spectrum selection criteria for the UE, receive a response from the policy control element that includes the spectrum selection criteria for the UE, process the spectrum selection criteria to allocate resources for transmissions involving the UE on the licensed spectrum and on the unlicensed spectrum, and provide a control message including the allocated resources through a radio interface component towards the UE to enable the UE to perform the transmissions on the unlicensed spectrum, the licensed spectrum, or a combination of the unlicensed spectrum and the licensed spectrum based on the allocation.

Another embodiment comprises a base station comprising a first radio interface component configured to communicate with a UE through radio communications on a licensed spectrum for a carrier to provide the UE access to a core network. The base station further includes a second radio interface component configured to communicate with the UE through radio communications on an unlicensed spectrum to provide the UE access to the core network. The base station further includes a network interface component configured to directly interface with a policy control element of the core network. The base station further includes a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on the unlicensed spectrum, and to provide a control message including the allocated resources through one of the first radio interface component or the second radio interface component towards the UE to enable the UE to perform the transmissions on the unlicensed spectrum, the licensed spectrum, or a combination of the unlicensed spectrum and the licensed spectrum based on the allocation.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
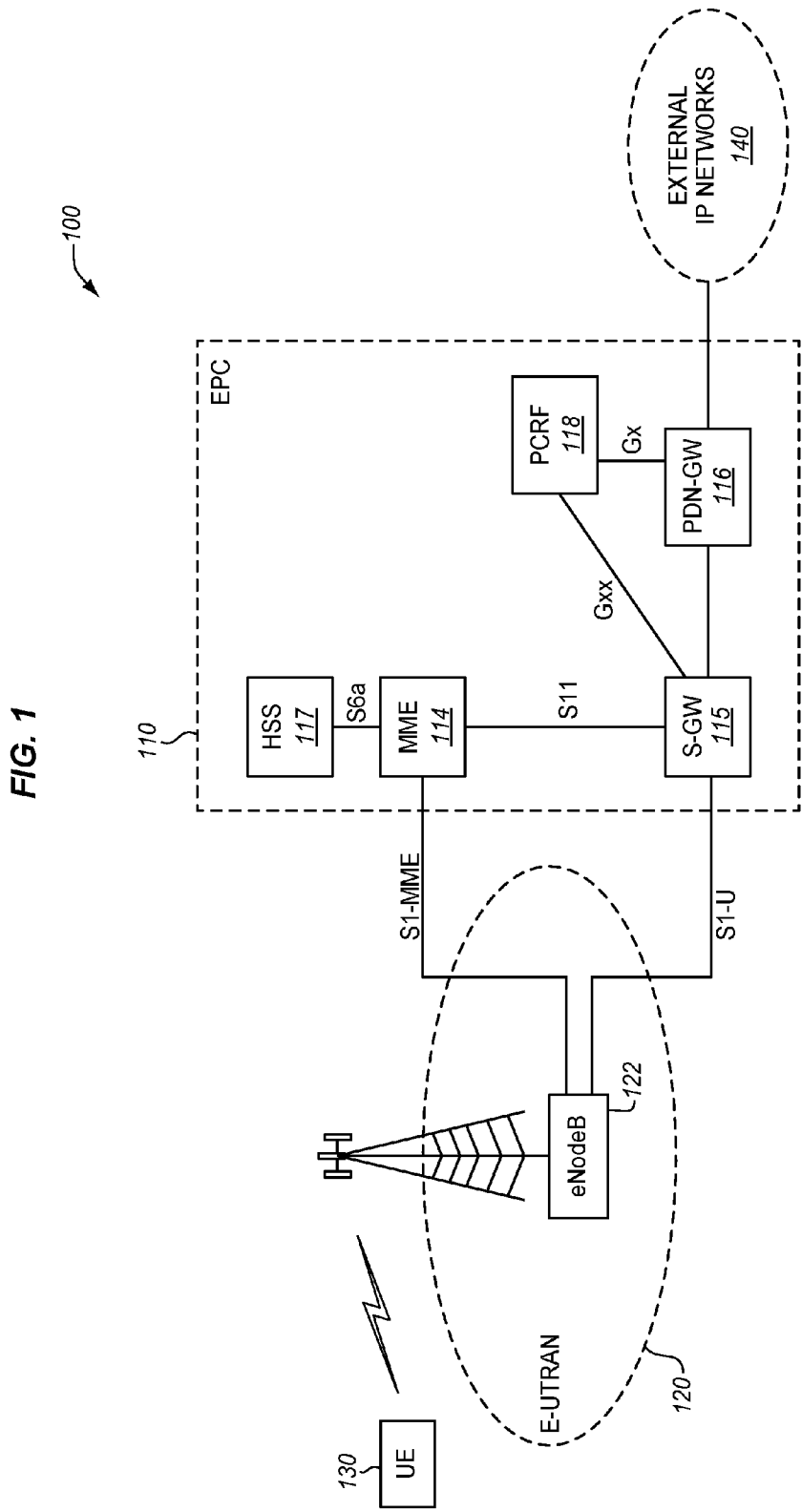
FIG. 1 illustrates a Long Term Evolution (LTE) system.

FIG. 1 illustrates a Long Term Evolution (LTE) system 100. As suggested by the 3GPP, LTE system 100 includes a core network, which is referred to as the Evolved Packet Core (EPC) network 110. LTE system 100 also includes a Radio Access Network (RAN), which is illustrated as an Evolved-UMTS Terrestrial Radio Access Network (E-UTRAN) 120 having one or more Evolved-NodeBs (eNodeB) 122 (i.e., base stations). Although only one eNodeB 122 is shown in FIG. 1, E-UTRAN 120 may include multiple eNodeBs. User Equipment (UE) 130 is able to attach to E-UTRAN 120 to access EPC network 110. E-UTRAN 120 is the air interface between UE 130 and EPC network 110 that provides high data rate and low-latency radio-access technology.

EPC network 110 includes a Mobility Management Entity (MME) 114, a Serving Gateway (S-GW) 115, a Packet Data Network Gateway (PDN-GW) 116, a Home Subscriber Server (HSS) 117, and a Policy and Charging Rules Function (PCRF) 118, but may include other elements not shown. Within the EPC network 110, the user data (also referred to as the "user plane") and the signaling (also referred to as the "control plane") are separated. MME 114 handles the control plane within EPC network 110. For instance, MME 114 handles the signaling related to mobility and security for E-UTRAN access. MME 114 is responsible for tracking and paging UE 130 in idle-mode. S-GW 115 and PDN-GW 116 handle the user plane. S-GW 115 and PDN-GW 116 transport IP data traffic between UE 130 and the external IP networks 140. S-GW 115 is the point of interconnect between the radio-side and EPC network 110, and serves UE 130 by routing incoming and outgoing IP packets. S-GW 115 is also the anchor point for the intra-LTE mobility (i.e., in case of handover between eNodeBs), and between LTE and other 3GPP accesses. PDN-GW 116 is the point of interconnect between EPC network 110 and external IP networks 140, and routes packets to and from external IP networks 140. HSS 117 is a database that stores user-related and subscriber-related information. PCRF 118 provides a Policy and Charging Control (PCC) solution in EPC network 110. PCRF 102 is a node or entity of EPC network 110 that formulates PCC rules for services requested by an end user, which is referred to as making a PCC decision.

The eNodeB 122 connects to EPC network 110 through S1 interfaces. As described by the 3GPP, such as in Technical Specification (TS) 36.410 (version 13.0.0 available Dec. 23, 2015), there are two types of S1 interfaces defined at the boundary between EPC network 110 and E-UTRAN 120: S1-MME and S1-U. The S1-MME interface is the reference point for the control plane protocol between E-UTRAN 120 and MME 114. The S1-U interface is the reference point between E-UTRAN 120 and S-GW 115 for user plane tunneling and inter-eNodeB switching during handover. MME 114 connects to S-GW 115 through the S11 interface, and connects to HSS 117 through the S6a interface. The S6a interface enables transfer of subscription and authentication data for authenticating or authorizing user access between MME 114 and HSS 117. PCRF 118 connects to PDN-GW 116 through the Gx interface. The Gx interface provides transfer of (QoS) policy and charging rules from PCRF 118 to a Policy and Charging Enforcement Function (PCEF) in PDN-GW 116. PCRF 118 connects to S-GW 115 through the Gxx interface. The Gxx interface resides between PCRF 118 and a Bearer Binding and Event Reporting Function (BBERF) integrated within S-GW 115.

The amount of data traffic carried over LTE or other types of mobile networks is expected to increase due to the number of users and the number of services accessed by the users. Carriers need to provide very high data rates to meet customer expectations on their mobile devices. For a typical carrier, the preferred type of RF spectrum to serve customers is the licensed spectrum. E-UTRAN 120 as shown in FIG. 1 operates on the licensed spectrum. For example, the carrier that owns/operates E-UTRAN 120 will acquire a license to use a particular frequency band or frequency bands in the licensed spectrum. Through the licensed band, E-UTRAN 120 is able to deliver predictable and high-quality services with the highest spectral efficiency.

However, if carriers are not able to provide high enough data rates through the licensed spectrum, more RF spectrum may be needed for use by the carriers. One way of gaining more bandwidth is by tapping into the unlicensed spectrum. A carrier may use the unlicensed spectrum as a complement to the licensed spectrum to provide carrier-grade wireless services. For example, WiFi access points operate in the unlicensed spectrum (e.g., 5 GHz). Traffic involving a UE may be offloaded from the E-UTRAN 120 to the WiFi access points, which expands the overall spectrum available to carriers. E-UTRAN 120 will be used to carry some or all of the control signals for the traffic carried on the unlicensed spectrum. Proposals have been made to standardize the use the unlicensed spectrum for LTE. For example, LTE in unlicensed spectrum (LTE-U) is a proposal for the use of 4G LTE radio communications technology in unlicensed spectrum, such as the 5 GHz band used by dual-band Wi-Fi equipment. Licensed-Assisted Access (LAA) is a proposal in the 3GPP for use of the unlicensed spectrum in LTE (see 3GPP TR 36.300 (version 12.5.0 available Mar. 25, 2015)). LTE-WLAN Radio Level Aggregation (LWA) is a proposal to offload some packets on the unlicensed spectrum. The use of LTE on the unlicensed spectrum may serve as an additional tool by a carrier to maximize the value they can provide to customers, while the core of the activity of the carrier remains anchored to the licensed spectrum.

Figure 2:
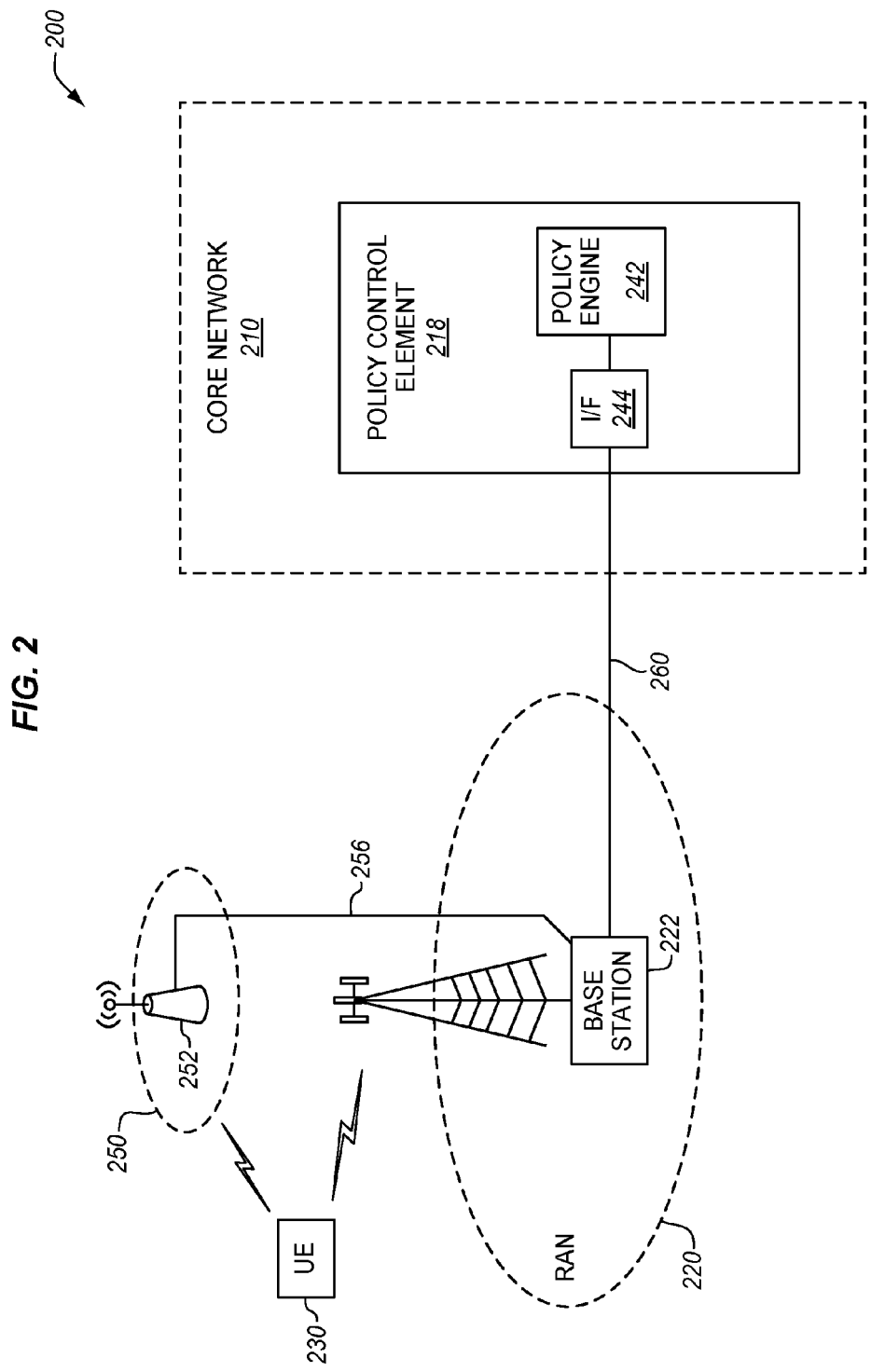
FIG. 2 is a block diagram of a communication system that uses the licensed spectrum for a carrier and the unlicensed spectrum in an exemplary embodiment.

FIG. 2 is a block diagram of a communication system 200 that uses the licensed spectrum for a carrier and the unlicensed spectrum in an exemplary embodiment. Communication system 200 may represent an LTE system, or another type of system that provides 4G communications or later generation communications, such as 5G. Communication system 200 includes a core network 210, which is the central part of a telecommunications network that provides services to customers who are connected by an access network. Core network 210 may comprise an EPC network as suggested by the 3GPP. Communication system 200 further includes a RAN 220, which includes equipment that uses radio access technology to interface User Equipment (e.g., UE 230) with core network 210. One example of RAN 220 is an E-UTRAN. UE 230 comprises any device used directly by an end user to communicate, such as a mobile phone, a tablet, a computer equipped with a mobile broadband adapter, or any other device.

RAN 220 includes one or more base stations 222. Base station 222 comprises a device that uses radio communication technology to communicate with a UE, and interface the UE with core network 210. One example of base station 222 is an eNodeB of an E-UTRAN. Although only one base station 222 is shown in FIG. 2, RAN 220 may include multiple base stations. It is assumed that RAN 220 is operated by a carrier (e.g., Verizon Wireless®), and that an exclusive license has been granted to the carrier to operate on the licensed spectrum. Therefore, base station 222 will operate on one or more frequency bands granted to the carrier on the licensed spectrum.

Communication system 200 also includes a Wireless Local Area Network (WLAN) 250. WLAN 250 is a network in which a mobile user is able to connect to a Local Area Network (LAN) through a wireless (radio) connection. WLAN 250 includes one or more wireless access points 252. A wireless access point 252 is a device that uses radio communication technology to communicate with a mobile device over an unlicensed spectrum, and provides the mobile device access to the core network by operating on the unlicensed spectrum. One example of wireless access point 252 is a WiFi access point that operates on the 2.4 GHz or 5 GHz radio bands. The carrier may have an agreement or approval to use one or more frequency bands on the unlicensed spectrum. For example, an agreement could be reached between multiple carriers for exclusive use of the unlicensed spectrum within a given region to avoid inter-operator interference.

Wireless access point 252 is connected to base station 222 by a control link 256. Control link 256 may be used by base station 222 to exchange user plane and control plane data with wireless access point 252. Control link 256 may also be used by wireless access point 252 to exchange user plane data with base station 222 for downlink (DL) transmissions or uplink (UL) transmissions involving UE 230. In one embodiment, wireless access point 252 may be integrated with base station 222 so that base station 222 has capabilities of operating on the licensed spectrum and the unlicensed spectrum, such as for a small cell implementation.

In this embodiment, UE 230 has multi-band capabilities, which means it is able to communicate using the licensed spectrum of the carrier and using the unlicensed spectrum. When accessing a service from core network 210, UE 230 may exchange transmissions with base station 222 and/or wireless access point 252. In other words, some communications may be on the unlicensed spectrum instead of or in addition to the licensed spectrum of the carrier to increase the overall bandwidth available to the carrier. In this embodiment, RAN 220 and/or core network 210 maintain control of the services over the unlicensed spectrum. When a traditional smart phone accessed a WiFi hotspot, for example, the smart phone would have access to the Internet through the WiFi hotspot, and transmissions would not go through the core network of the carrier. In the embodiments described herein, RAN 220 and/or core network 210 maintain control of transmissions through wireless access point 252. The traffic originating through wireless access point 252 may be routed through RAN 220 over control link 256. That way, policies of core network 210 may be enforced on the traffic so that carrier-grade services may be provided even though data flows over the unlicensed spectrum instead of the licensed spectrum of the carrier.

Core network 210 includes a policy control element 218. Policy control element 218 comprises any node or element of core network 210 that formulates policies or rules for services requested by an end user. One example of policy control element 218 is a PCRF as suggested by the 3GPP for the EPC. Policy control element 218 is enhanced in this embodiment with a policy engine 242 that is configured to generate or formulate criteria for allocating resources for transmissions involving a UE on the unlicensed spectrum and on the licensed spectrum. The criteria, referred to herein as spectrum selection criteria, comprise any policies or rules that are used to select the unlicensed spectrum and/or the licensed spectrum for transmissions. Policy control element 218 is also enhanced with an interface component (I/F) 244 that provides a direct interface 260 with base station 222. Direct interface 260 is a control-layer or control plane interface for exchanging control signaling directly between policy control element 218 and base station 222. Through direct interface 260, policy control element 218 is able to provide the spectrum selection criteria directly to base station 222 without have to use MME 114, S-GW 115 or PDN-GW 116 as an intermediary router. The direct interface 260 may be over a direct physical link or a direct logical link. Direct interface 260 may be based on the Gx reference point as suggested by the 3GPP.

Traditionally, a base station in a RAN is not involved with policy handling that is part of standard core network capability. In the embodiments described herein, base station 222 is provided with the spectrum selection criteria, and is able to enforce the spectrum selection criteria for communications involving UE 230. Therefore, policy control for use of the unlicensed spectrum is anchored in base station 222 of RAN 220 and in core network 210.

Figure 3:
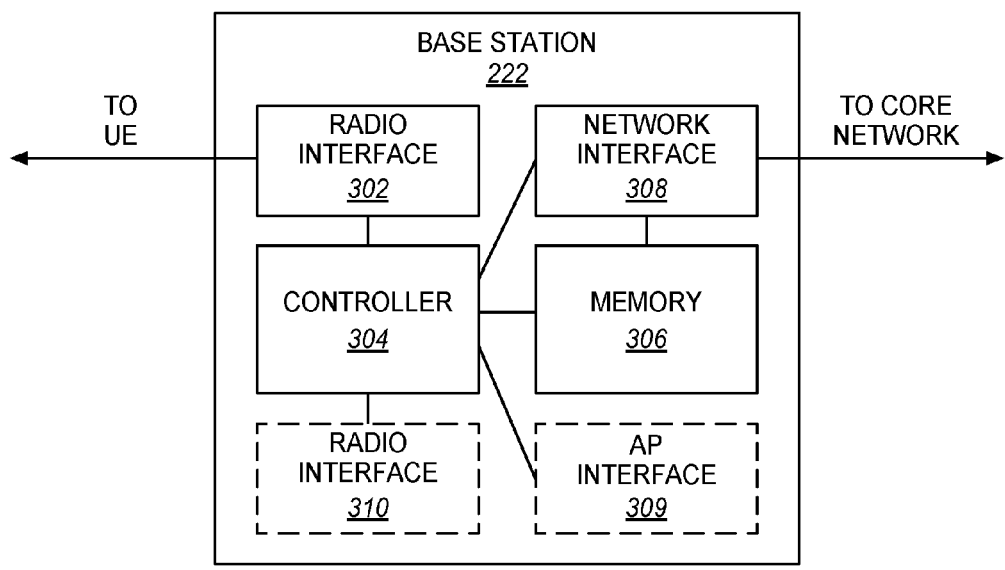
FIG. 3 is a block diagram of a base station in an exemplary embodiment.

FIG. 3 is a block diagram of base station 222 in an exemplary embodiment. Base station 222 includes a radio interface component 302, a controller 304 (including a processor), a memory 306, and a network interface component 308. Radio interface component 302 represents the local radio resources of base station 222, such as transceivers and antennas, used for wireless communications to exchange over-the-air signals. Radio interface component 302 is capable of communicating on the licensed spectrum of the carrier. Controller 304 represents the internal circuitry, logic, hardware (e.g., a processor), software, etc., that provides the functions of base station 222. In this embodiment, base station 222 (through controller 304) is enabled for retrieving and enforcing spectrum selection criteria for communications involving UE 230. Memory 306 is a storage unit for data, instructions, applications, etc., and is accessible by controller 304. Network interface component 308 is an interface component that provides direct interface 260 with policy control element 218. Network interface component 308 may be configured to use the Gx reference point as suggested by the 3GPP.

In one embodiment, base station 222 may further include an Access Point (AP) interface 309. AP interface 309 is an interface component that communicates with one or more wireless access points (e.g., wireless access point 252) that operate on the unlicensed spectrum. One of the functions of AP interface 309 is to exchange data with wireless access point 252. AP interface 309 may also provide routing functions, gateway functions, protocol conversion, etc.

In one embodiment, base station 222 may further include another radio interface component 310 that is capable of communicating on an unlicensed spectrum. For example, radio interface component 310 may represent a WiFi component, including antennas and transceivers, or another type of component that uses the unlicensed spectrum.

At least parts of the above described RAN 220, including base station 222, could be implemented using network functions virtualization (NFV). NFV is a network architecture that makes use of technologies of computer virtualization. Entire network equipment like base stations or parts thereof or part of their functions can be virtualized using software building blocks that may connect, or interact, to create communication services. A virtualized network function of a base station, for example, may include at least one virtual machine running different software and processes, on top of standard high-volume servers, switches and storage, or a cloud computing infrastructure, instead of having customized hardware appliances for each network function. As such, a base station function may be implemented using a computer program product embodied on a non-transitory computer readable medium for performing operations, wherein the computer program product comprises instructions, that when executed by a processor, perform the operations of the specific base station function.

In one embodiment, radio interface component 302 and radio interface component 310 may be implemented at a common location. In another embodiment, radio interface component 302 and radio interface component 310 may be implemented at remote locations. When at a remote location, radio interface component 302 and/or radio interface component 310 may connect to controller 304 (e.g., via optical links) for processing of data.

Figure 4:
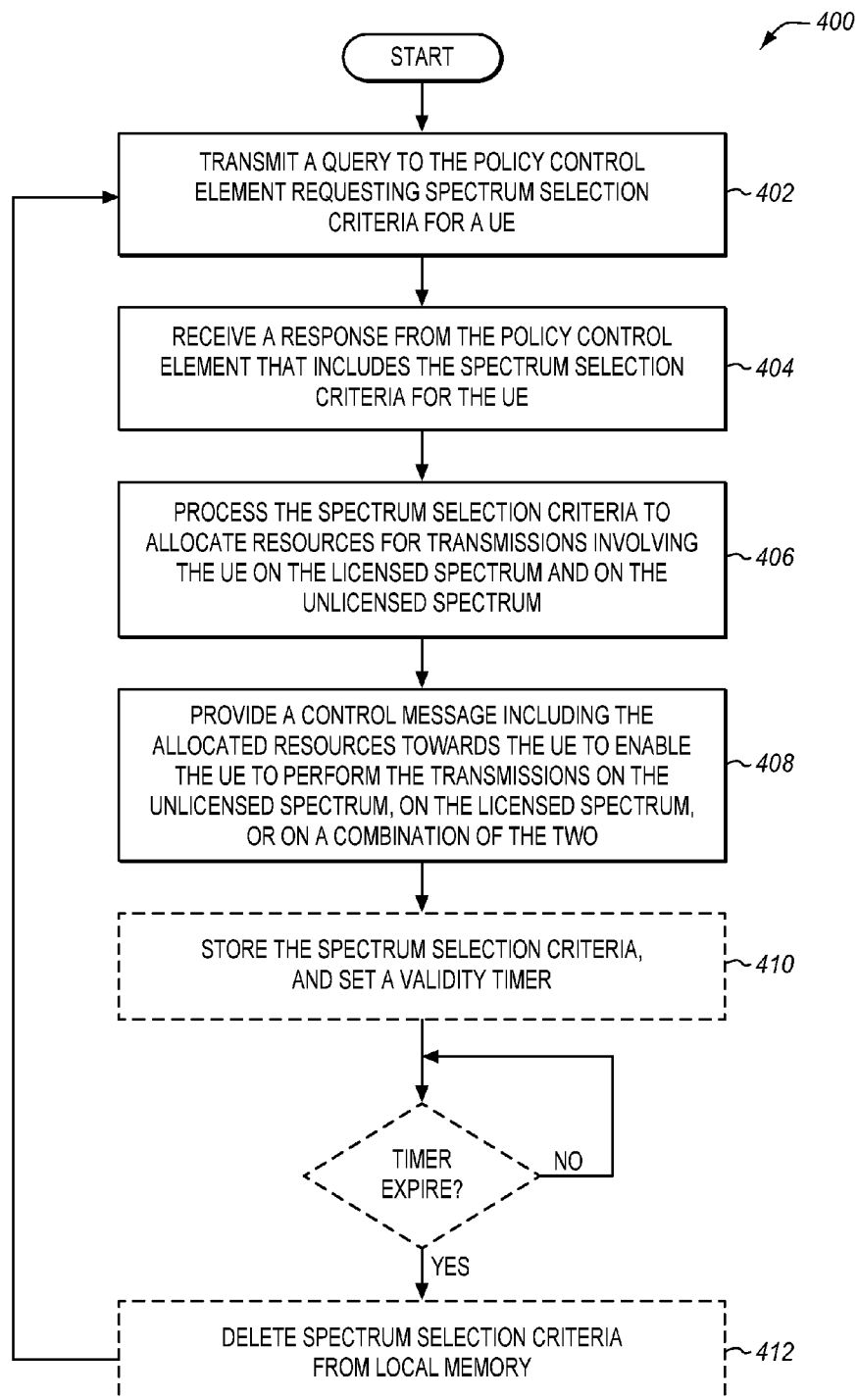
FIG. 4 is a flow chart illustrating a method for providing policy control for transmissions on the unlicensed spectrum in an exemplary embodiment.

FIG. 4 is a flow chart illustrating a method 400 for providing policy control for transmissions on the unlicensed spectrum in an exemplary embodiment. The steps of method 400 will be described with reference to communication system 200 in FIG. 2, but those skilled in the art will appreciate that method 400 may be performed in other systems. Also, the steps of the flow charts described herein are not all inclusive and may include other steps not shown, and the steps may be performed in an alternative order.

It is assumed in this embodiment that UE 230 (see FIG. 2) is located in a geographic area proximate to base station 222 and wireless access point 252. Base station 222 and wireless access point 252 each provide a coverage area, referred to as a cell. For example, base station 222 may provide a macro cell or a small cell. Wireless access point 252 may provide a small cell, femto cell, etc. UE 230 is mobile and may move into and out of the cells of base station 222 and wireless access point 252. When UE 230 is in range of base station 222 only, UE 230 will be served by base station 222 on the licensed spectrum. However, when UE 230 moves into range of wireless access point 252, UE 230 may be served by wireless access point 252 and transmissions involving UE 230 may flow on the unlicensed spectrum.

To determine how transmissions are allocated on the licensed spectrum and on the unlicensed spectrum, controller 304 of base station 222 (see FIG. 3) transmits a query to policy control element 218 through network interface component 308 (step 402). The query from base station 222 requests spectrum selection criteria for UE 230. Controller 304 may have various triggers for sending the query to policy control element 218. For example, controller 304 may trigger the query in response to UE 230 attaching to RAN 220, in response to UE 230 initiating a service (e.g., voice call), in response to expiration of a timer so that base station 222 stores the most recent spectrum selection criteria, or in response to any other trigger.

Interface component 244 of policy control element 218 receives the query over the direct interface 260. In response to the query, policy engine 242 generates or formulates the spectrum selection criteria for UE 230. Policy engine 242 may be tasked with formulating policies for all aspects of services provided by core network 210. For example, policy engine 242 may make Policy and Charging Control (PCC) decisions for service data flows initiated within core network 210. Generation of spectrum selection criteria by policy engine 244 is a policy decision made in addition to traditional PCC decisions. The policy decision made in formulating the spectrum selection criteria is specific to the use of the unlicensed spectrum in providing services to UE 230. Also, the policy decision made in formulating the spectrum selection criteria is specific for enforcement by base station 222 that operates on the licensed spectrum. Interface component 244 then transmits the spectrum selection criteria to base station 222.

Controller 304 in base station 222 receives a response from policy control element 218 through network interface component 308 that includes the spectrum selection criteria for UE 230 (step 404 in FIG. 4). Controller 304 is enabled to enforce the spectrum selection criteria selected for UE 230 by policy control element 218. To do so, controller 304 processes the spectrum selection criteria to allocate resources for transmissions involving UE 230 on the licensed spectrum and on the unlicensed spectrum (step 406). The allocation by controller 304 may be for UE 230 to use the unlicensed spectrum only. In this scenario, UE 230 and wireless access point 252 exchange uplink (UL) and downlink (DL) data on the unlicensed spectrum. The allocation by controller 304 may be for UE 230 to use the licensed spectrum only. In this scenario, UE 230 and base station 222 exchange UL and DL data on the licensed spectrum. The allocation by controller 304 may be a combination of the unlicensed spectrum and the licensed spectrum. In this scenario, UE 230 and base station 222 exchange UL and DL data using the licensed spectrum, and in addition, part of the unlicensed spectrum is used only for DL data to make more bandwidth available for downloads to UE 230. In another scenario, UE 230 is allocated for simultaneous use of UL and DL channels on part of the licensed spectrum, and UL and DL channels on part of the unlicensed spectrum.

The "transmissions" may be data flows for a service accessed by UE 230. For example, the transmissions may be "user plane" transmissions that use data packets or data bearers. Therefore, the allocation by controller 304 may be whether UE 230 uses the licensed spectrum and/or unlicensed spectrum for "user plane" transmissions.

Controller 304 in base station 222 provides a control message including/indicating the allocated resources toward UE 230 to enable UE 230 to perform the transmissions on the unlicensed spectrum, on the licensed spectrum, or on a combination of the unlicensed spectrum and the licensed spectrum based on the allocation (step 408). For example, the control message may indicate whether UE 230 should perform transmissions using base station 222 (or another base station) on the licensed spectrum or wireless access point 252 on the unlicensed spectrum. The control message in step 408 may alternatively indicate to UE 230 to perform transmissions on both the licensed spectrum and the unlicensed spectrum, such as in the case where transmissions on the unlicensed spectrum are used to supplement transmissions on the licensed spectrum. Controller 304 may transmit the control message to UE 230 (if it is in range), may provide the control message through another base station of RAN 220 that is in range of UE 230, may provide the control message to UE 230 through wireless access point 252, etc.

In response to the control message, UE 230 will select base station 222 and/or wireless access point 252 for transmissions. If the licensed spectrum was allocated to UE 230 for transmissions, then UE 230 will exchange packets with base station 222 or another base station operating on the licensed spectrum of the carrier. If the unlicensed spectrum was allocated to UE 230 for transmissions, then UE 230 will exchange packets with wireless access point 252 or another access point operating on the unlicensed spectrum. If both the unlicensed spectrum and the licensed spectrum were allocated to UE 230 for transmissions, then UE 230 will exchange a first portion of the packets (e.g., for a session) with wireless access point 252, and exchange a second portion of the packets with base station 222. UE 230 may schedule the packets on the licensed spectrum (e.g., served by base station 222) and the packets on the unlicensed spectrum (e.g., served by wireless access point 252) based on information provided in the control message. For example, the information may indicate a percentage of packets allocated to each spectrum. In this scenario, the packets will be aggregated at RAN 220 (e.g., in base station 222).

When receiving the control message, UE 230 may be in idle mode or in connected mode (i.e., has an active session). When UE 230 is in idle mode, UE 230 attaches to base station 222 and/or wireless access point 252 based on the control message from base station 222. If UE 230 initiates a session (e.g., voice call), then UE 230 may initiate transmissions over the licensed spectrum or the unlicensed spectrum depending on whether it is attached to base station 222 or wireless access point 252. When UE 230 is in connected mode, UE 230 may begin a handover procedure to transfer the session from the licensed spectrum to the unlicensed spectrum, or vice-versa. If UE 230 is initially operating on the licensed spectrum, then UE 230 may perform the handover procedure by attaching to wireless access point 252, and moving transmissions from base station 222 to wireless access point 252. If UE 230 is initially operating on the unlicensed spectrum, then UE 230 may perform the handover procedure by attaching to base station 222, and moving transmissions from wireless access point 252 to base station 222.

The format of the control message may vary as desired. In one embodiment, controller 304 may modify a neighbor cell list (e.g., neighbor cell relation (NCR) list) that is provided to UE 230. In normal operation, UE 230 may continuously measure the Reference Signal Received Power (RSRP) from base station 222 and other candidate cells in the vicinity of UE 230 that might be considered as candidates. UE 230 may also measure the signal power of wireless access point 252 along with other wireless access points on the unlicensed spectrum. UE 230 may report the RSRP and other signal powers for candidate cells to base station 222. Controller 304 in base station 222 may process the report from UE 230, and generate a neighbor cell list that indicates the primary cell for UE and one or more secondary cells that are candidates for access or handover. Controller 304 may generate the neighbor cell list based on the spectrum selection criteria. For instance, if controller 304 selects base station 222 on the licensed spectrum for UE 230 based on the spectrum selection criteria, then controller 304 may place base station 222 as the primary cell in the neighbor cell list. If controller 304 selects wireless access point 252 on the unlicensed spectrum for UE 230 based on the spectrum selection criteria, then controller 304 may place wireless access point 252 as the primary cell in the neighbor cell list.

UE 230 may then attach to base station 222 or wireless access point 252 for transmission based on the neighbor cell list.

Controller 304 in base station 222 may store the spectrum selection criteria for UE 230 in local memory, and start a validity timer (optional step 410). The validity timer indicates how long the spectrum selection criteria are valid for UE 230. Controller 304 may retrieve the spectrum selection criteria from local memory when determining whether UE 230 transmits on the licensed and/or unlicensed spectrum for access or handover. Upon expiration of the validity timer, controller 304 may delete the spectrum selection criteria for UE 230 (optional step 412). Method 400 may then return to step 402 where controller 304 sends another query to policy control element 218 for spectrum selection criteria for UE 230.

Figure 5:
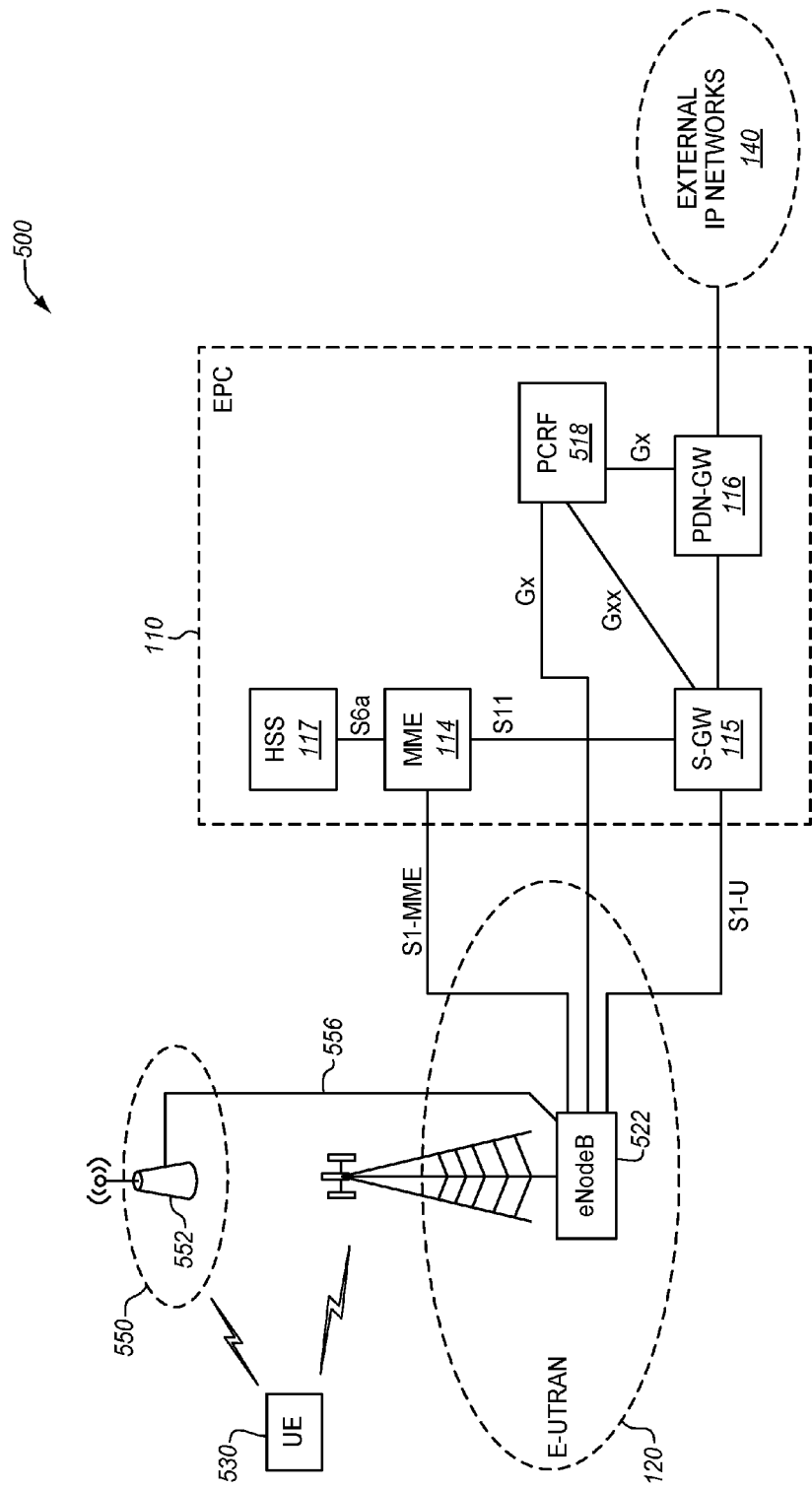
FIG. 5 illustrates an LTE system in an exemplary embodiment.

The concepts described above may be applicable in an LTE system. FIG. 5 illustrates an LTE system 500 in an exemplary embodiment. As with FIG. 1, LTE system 500 includes EPC network 110 and E-UTRAN 120. E-UTRAN 120 includes one or more enhanced eNodeBs 522. The eNodeB 522 of E-UTRAN 120 is enhanced to enforce spectrum selection criteria for UE 530, such as described above for base station 222 of FIG. 2. It is assumed that E-UTRAN 120 is operated by a carrier (e.g., Verizon Wireless®), and that an exclusive license has been granted to the carrier to operate on the licensed spectrum. Therefore, eNodeB 522 will operate on one or more frequency bands granted to the carrier in the licensed spectrum.

LTE system 500 also includes a WLAN 550 that operates on the unlicensed spectrum. WLAN 550 includes a wireless access point 552 that is able to communicate with UE 530 over the unlicensed spectrum. One example of wireless access point 552 is a WiFi access point that operates on the 2.4 GHz or 5 GHz radio bands. Wireless access point 552 is connected to eNodeB 522 by a control link 556. Control link 556 may be used by eNodeB 522 to exchange user plane and control plane data with wireless access point 552.

Figure 6:
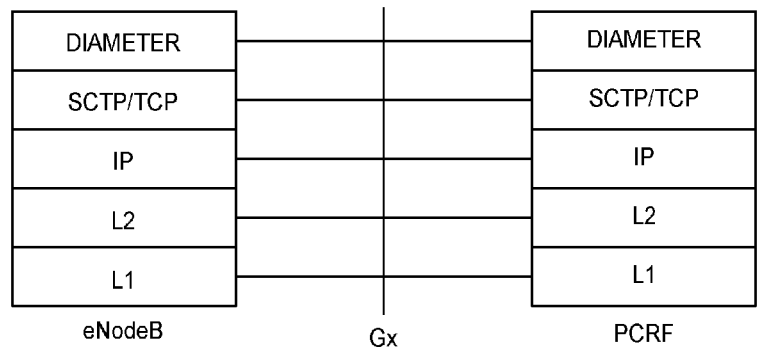
FIG. 6 illustrates a protocol stack for the Gx protocol.

The PCRF 518 of EPC 110 is enhanced in this embodiment to generate or formulate spectrum selection criteria for UE 530, and provide the spectrum selection criteria to eNodeB 522. To allow PCRF 518 to provide the spectrum selection criteria to eNodeB 522, a Diameter protocol Gx interface (or like) is defined between eNodeB 522 and PCRF 518, such as based on 3GPP standard TS 29.211 (version 6.4.0 available Jun. 22, 2007). The Gx protocol is based on Diameter and is defined as a vendor-specific Diameter application. The Gx Diameter application is constructed on the base Diameter protocol and incorporates Attribute Value Pairs (AVPs) and commands from the Diameter Credit Control Application (DCCA). FIG. 6 illustrates the protocol stack for the Gx protocol.

The Gx interface represents a direct interface between eNodeB 522 and PCRF 518 so that eNodeB 522 may query PCRF 518 directly for the spectrum selection criteria, and so that PCRF 518 may send the spectrum selection criteria directly to eNodeB 522. In alternative embodiments, a Gx interface may be defined between PCRF 518 and wireless access point 552.

In this embodiment, when accessing a service from EPC network 110, UE 530 may exchange transmissions with eNodeB 522 and/or wireless access point 552. Transmissions between eNodeB 522 and UE 530 are on the licensed spectrum of the carrier, and transmissions between wireless access point 552 and UE 530 are on the unlicensed spectrum. The decision on whether UE 530 uses the licensed spectrum, the unlicensed spectrum, or a combination of the two is based on the spectrum selection criteria provided by PCRF 518.

It is assumed in this embodiment that UE 530 is located in a geographic area proximate to eNodeB 522 and/or wireless access point 552. To determine whether UE 530 should attach to eNodeB 522 and/or wireless access point 552, eNodeB 522 transmits a query to PCRF 518 requesting spectrum selection criteria for UE 530. In order to retrieve the spectrum selection criteria from PCRF 518 in EPC network 110, eNodeB 522 supports the Gx interface. Thus, the query from eNodeB 522 may be a Re-Auth-Request (RAR) of the Gx reference point or another type of Gx signaling message. PCRF 518 may include a policy engine that generates or formulates the spectrum selection criteria for UE 530. PCRF 518 may make PCC decisions for service data flows initiated within EPC network 110. Generation of spectrum selection criteria by PCRF 518 is a policy decision made in addition to traditional PCC decisions. The policy decision made in formulating the spectrum selection criteria is specific to use of the unlicensed spectrum in providing services to UE 530. Also, the policy decision made in formulating the spectrum selection criteria is specific for enforcement by eNodeB 522 that operates on the licensed spectrum. PCRF 518 provides the spectrum selection criteria to eNodeB 522 over the Gx interface, such as in a Re-Auth-Answer (RAA) of the Gx reference point.

The eNodeB 522 is enabled to enforce the spectrum selection criteria selected for UE 530 by PCRF 518. To do so, eNodeB 522 processes the spectrum selection criteria to allocate resources for transmissions involving UE 530 on the unlicensed spectrum and on the licensed spectrum. For example, eNodeB 522 may determine, based on the criteria, whether UE 530 operates on the unlicensed spectrum only, on the licensed spectrum only, or on a combination of the unlicensed spectrum and the licensed spectrum. The eNodeB 522 then provides a control message to UE 530 indicating the spectrum(s) to use for transmissions, such as for a single session or multiple sessions.

To support transport of the spectrum selection criteria over the Gx interface, new Attribute Value Pairs (AVP) may be added to the Gx reference point to form an enhanced Gx reference point. In addition to standards-based AVPs applicable to the Gx reference point, one or more of following new AVPs may be supported for the enhanced Gx interface between eNodeB 522 and PCRF 518: Coexistence-Criteria AVP, Low-Interference-Criteria AVP, Traffic-Criteria AVP, Time-Criteria AVP, Smart-Pricing-Criteria AVP, Precedence-Global-Sub-Rule AVP, and/or Priority-Among-Criteria-Rule AVP. The attribute names listed above may vary as desired.

As a description of the usage of the above AVPs in the enhanced Gx interface, the Coexistence-Criteria AVP is used for criteria or policies to indicate fair and balanced load among different spectrum carriers. The criteria are for effective and fair coexistence with Wi-Fi, and effective and fair coexistence among Licensed-Assisted Access (LAA) networks deployed by different operators.

The Low-Interference-Criteria AVP is used for criteria or policies to insure quality of aggregated carriers. The criteria are used to select the carriers with low or the lowest interference to achieve co-existence with other unlicensed spectrum deployments.

The Traffic-Criteria AVP is used for criteria or policies for allocating resources for transmissions involving a UE on the unlicensed spectrum and on the licensed spectrum based on traffic over the licensed spectrum and/or the unlicensed spectrum. This AVP may include wireless network (licensed spectrum) traffic criteria that is based on a traffic indicator. For example, if the traffic indicator is greater than X, don't use wireless technology to send a broadcast message. If the traffic indicator is less than Y, always use wireless technology. This AVP may also include WiFi technology (unlicensed spectrum) selection options. For example, one option may be to always use WiFi regardless of wireless network traffic. Another option may be to use WiFi technology only when wireless network traffic is too high (i.e., above a threshold).

The Time-Criteria AVP is used for criteria or policies for allocating resources for transmissions involving a UE on the unlicensed spectrum and on the licensed spectrum based on time of day or day of the week. In an example, for certain time periods of day/week, wireless technology is always used. For certain time periods of day/week, WiFi technology is always used. For certain time periods of day/week, WiFi and wireless technologies are always used in parallel.

The Smart-Pricing-Criteria AVP is used for criteria or policies for allocating resources for transmissions involving a UE on the unlicensed spectrum and on the licensed spectrum based on cost of transmissions over the licensed spectrum or the unlicensed spectrum. For example, WiFi technology is always used as first priority due to cost. For speed consideration, select a spectrum with less traffic.

The Precedence-Global-Sub-Rule AVP is used to indicate whether the criteria or policies may be supported as a global policy along with a per-subscriber policy that is governed by following rules: 1) the global policy takes precedence over the per-subscriber policy, or 2) the per-subscriber policy takes precedence over the global policy.

The Priority-Among-Criteria-Rule AVP is used to indicate the priority among criteria. For example, speed/traffic criteria takes priority, time criteria takes priority, the low-cost criteria takes priority, etc.

Figure 7:
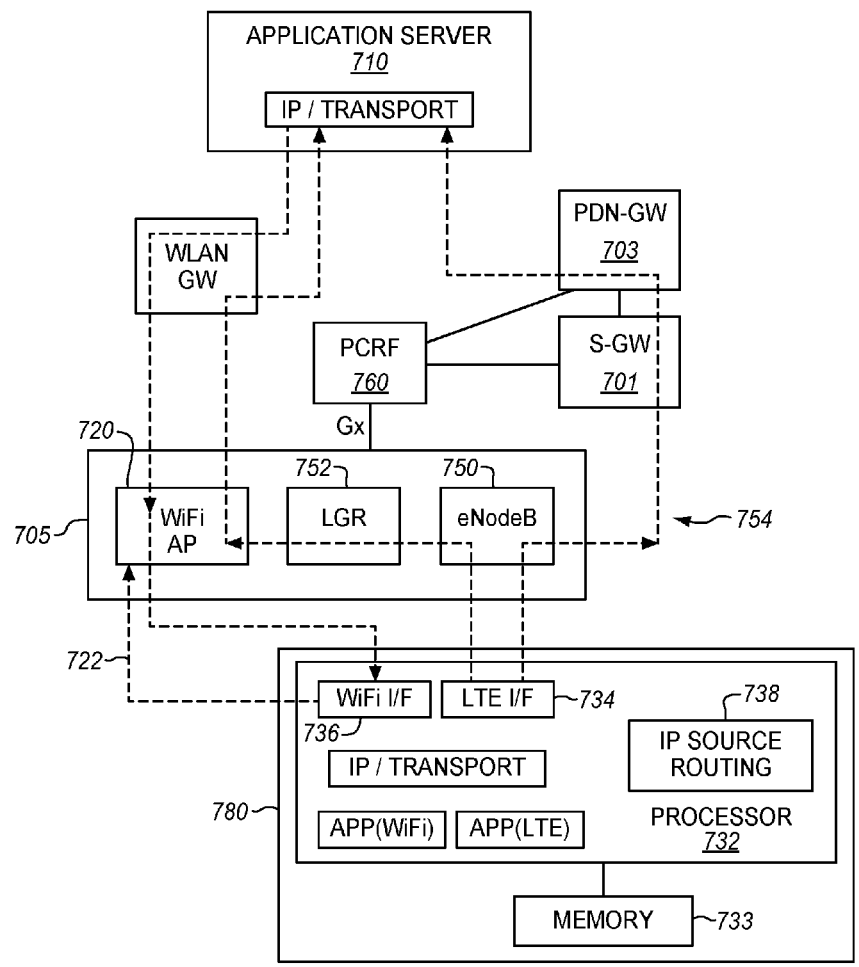
FIG. 7 illustrates an example of a communication system having integrated cellular (e.g., LTE) and WLAN (e.g., WiFi) systems.

FIG. 7 illustrates an example of a communication system having integrated cellular (e.g., LTE) and WLAN (e.g., WiFi) systems. This example will be described in the context of LTE and WiFi integration. However, embodiments may be extended to systems in which WiFi (or other contention-based wireless technology) is integrated with LTE or other data transport technologies like Wideband Code Division Multiple Access (WCDMA), High Speed Packet Access (HSPA), Code Division Multiple Access (CDMA), Evolution-data optimized (EVDO) radio access technology, high-speed downlink packet access (HSPDA), HSPDA+, worldwide interoperability for microwave access (WiMAX), etc.

Referring to FIG. 7, the communication system includes an application or proxy server (referred to herein as an application server) 710, a PDN-GW 703, an S-GW 701, and a small wireless cell 705. Application server 710 may be a web server that hosts multimedia content (e.g., voice, video, etc.). In another example, application server 710 may be a Voice over Internet Protocol (VoIP) server providing VoIP services to users in the network, a web server, an instant messaging server, an email server, a software and/or cloud server, or any other Internet Protocol (IP)-based service deliverable to a mobile or other device using 3GPP access and/or non-3GPP access (e.g., WLAN, WiFi, etc.). In this regard, downlink bearer IP traffic (also referred to herein as downlink bearer traffic, and includes downlink IP packets or IP packet flows) may include a webpage, a video, an email, an instant message, one direction of a VoIP call, one direction of a video call, or the like, which originates at application server 710, and is sent to small wireless cell 705 via the Internet. Uplink bearer IP traffic (also referred to herein as uplink bearer traffic, and includes uplink IP packets or IP packet flows) may include a request for a webpage, a request for a video, an email, an instant message, one direction of a VoIP call, one direction of a video call, upload of a video, or the like.

PDN-GW 703 serves as an interface between an IP Packet Data Network (IP-PDN) and an IP Connectivity Access Network (IP-CAN). PDN-GW 703 is responsible for IP address allocation for UEs, as well as Quality of Service (QoS) enforcement and flow-based charging according to rules from PCRF 760. PDN-GW 703 is operatively connected to S-GW 701 over the S5/S8 interface. S-GW 701 is also operatively connected to small wireless cell 705 over the S1-U interface.

S-GW 701 provides a connection between small wireless cell 705 and PDN-GW 703 by storing a current one-to-one mapping between Evolved Packet System (EPS) bearers carried over the S1-U interface (between S-GW 701 and small wireless cell 705) and the S5/S8 interface. S-GW 701 serves as the gateway between the evolved Universal Mobile Telecommunications System (UMTS) Terrestrial Radio Access Network (EUTRAN) and the EPC.

Still referring to FIG. 7, small wireless cell 705 includes an integrated eNodeB 750 (also referred to as a base station or base station module), a local gateway and router (LGR) (also referred to herein as a LGR module) 752, and a WiFi access point (AP) 720 (also referred to as a WLAN AP or WiFi AP module).

The eNodeB 750 provides wireless resources and radio coverage for UEs in the cellular coverage area of small wireless cell 705. The eNodeB 750 may provide wideband radio frequency resources (e.g., 3GPP-LTE, and the like), and may be based on either Frequency Division Duplexing (FDD) or Time Division Duplexing (TDD). The eNodeB 750 may also be based on scheduled access for user data such that the cellular links between the eNodeB 750 are understood to be scheduled, contentionless links (i.e., all downlink and uplink user plane transmissions for UEs via the cellular links are scheduled by the integrated eNodeB 750). The eNodeB 750 may be configured to communicate using existing procedures for use by wireless cells (e.g., a macro cell, micro cell, pico cell, eNodeB, eNB, HeNB, etc.) to communicate via a LTE air interface.

LGR 752 provides the IP anchor for the access point name (APN) used for WiFi uplink IP traffic offloaded from the WiFi link 722 to the LTE link 754. LGR 752 also establishes and maintains an interface (e.g., an internal IP tunnel) with WiFi AP 720, and forwards the uplink IP packets offloaded from the WiFi link 722 to the LTE link 754 based on the source IP address of the uplink IP packets, which is the source IP address of the WiFi interface 736 used by the application App(WiFi) at the UE 780, identified and determined to be part of the WLAN subnetwork. The source IP address of the WiFi interface 736 used by the application App(WiFi) at the UE 780 may also be referred to as the source IP address associated with the application App (WiFi).

WiFi AP 720 provides WiFi resources for UEs in the WiFi coverage area of small wireless cell 705. As is known, WiFi resources are time-shared channel resources that use a polite access protocol (e.g., Carrier Sense Multiple Access (CSMA)). According to the CSMA mechanism, each potential transmitter, including WiFi AP 720 and UEs, vie for use of the channel for both uplink and downlink transmissions and defers transmission until the channel is deemed to be clear.

At small wireless cell 705 shown in FIG. 7, the eNodeB 750 is communicatively connected to LGR 752, which is further communicatively coupled to WiFi AP 720 through an IP tunnel. A Gx interface is defined between PCRF 760 and eNodeB 750 and/or WiFi AP 720.

Still referring to FIG. 7, UE 780 is a multi-mode user device that supports both LTE-based and WiFi-based communications. For example, UE 780 may be a smartphone, a tablet computer, a laptop, a personal digital assistant (PDA), or the like. UE 780 may include: a processor (also referred to herein as a connection manager processor) 732; a memory 733; LTE interface (also referred to herein as a LTE I/F or cellular interface) 734; and WiFi interface (also referred to herein as a WiFi I/F or WLAN interface) 736. Processor 732 is communicatively connected to each of memory 733, LTE interface 734, and WiFi interface 736. Memory 733 stores programs and/or applications (e.g., application App(WiFi) and/or App(LTE)) that may be executed by processor 732, including those programs/routines/functions that provide functionality of the LTE-WLAN integration capability discussed herein. Memory 733 also stores data usable to provide, or generated as a result of, execution of various functions of the LTE-WLAN integration capability discussed herein. It will be appreciated that the implementation of UE 780 depicted in FIG. 7 is merely an example, and that UE 780 may be implemented in any other manner suitable for providing functions of the LTE-WLAN integration capability. Memory 733 may also store an IP routing table 738.

Still referring to FIG. 7, UE 780 includes application App(WiFi) and App(LTE). The application App(WiFi) is an application that connects to application server 710 via a first IP address, which is obtained through the association of UE 780 with WiFi AP 720. In this regard, the first IP address may be referred to as being obtained from a WLAN or WiFi network. The application App(WiFi) also receives downlink bearer traffic (also referred to as downlink data) from application server 710 via the WiFi AP 720 over WiFi link 722. UE 780 also sends WiFi acknowledgements (ACKs) and control messages over WiFi link 722 per the WiFi air interface protocol.

In one example, even when UE 780 offloads uplink IP packets originating at the application App(WiFi) from WiFi link 722 to LTE link 754, UE 780 may continue to send the WiFi acknowledgements (ACKs) and control messages over WiFi link 722. In this regard, UE 780 may send only the WiFi acknowledgements (ACKs) and control messages on the uplink over WiFi link 722.

The application App(LTE) is an application that connects to application server 710 via a second IP address, which is obtained through the association of UE 780 with the LTE network (also referred to as the cellular network). In this regard, the second IP address may be referred to as being obtained from a cellular IP network. The application App (LTE) also receives downlink bearer IP traffic (also referred to as downlink IP data) from application server 710 via eNodeB 750 over LTE link 754. On the uplink, the application App(LTE) sends uplink IP bearer traffic as well as WiFi bearer acknowledgements (ACKs) and Transport Control Protocol (TCP) ACKs. In at least some example embodiments, the WiFi bearer ACKs and TCP ACKs (e.g., associated with the application App(WiFi)) are sent only on the LTE uplink, not the WiFi uplink. The applications App (WiFi) and App(LTE) may be separate applications, or alternatively, portions of the same application that utilize separate packet flows (or subflows) of packets on one or more of the uplink and downlink.

Still referring to FIG. 7, when the WiFi interface 736 transmits uplink IP packets originating from the application App(WiFi), the IP address assigned by the WiFi network (discussed in more detail below) may be included as the source IP address in the header of the uplink IP packets in the uplink packet flow. Similarly, when LTE interface 734 transmits uplink IP packets originating from the application App(LTE), the IP address assigned by the LTE network to UE 780 for the application App(LTE) may be included as the source IP address in the header of the uplink IP packets of the uplink packet flow. By contrast, when LTE interface 734 transmits uplink IP packets originating from the application App(WiFi), the IP address assigned by the WiFi network may be used as the source IP address in the header of the uplink IP packets in the uplink IP packet flow. In this case, LGR 752 is used as the APN of the uplink IP packet flow originating from the application APP(WiFi), but transmitted by LTE interface 734 over LTE link 754 such that these uplink IP packets can be routed from eNodeB 750 to the WLAN for further transmission through the northbound IP network to, for example, application server 710. In this case, eNodeB 750 identifies the uplink IP packets originating from the application App(WiFi) based on the APN included in the header of the uplink IP packets. In this regard, the uplink IP packets having LGR 752 as the APN are routed to LGR 752, and then on to WiFi AP 720. The APN included in the header of the uplink IP packets may also serve as an indicator indicating that a given uplink IP packet originated from the application App(WiFi), but was received at eNodeB 750 over the LTE link 134 between the UE 780 and eNodeB 750.

As mentioned above, UE 780 further includes one or more IP routing table(s) 738. The IP routing table(s) 738 are configured such that all uplink IP traffic is routed to LTE interface 734 (e.g., IP Source Routing Rule Tx=LTE), and transmitted to eNodeB 750 over LTE link 754. That is, for example, all uplink IP traffic (including the TCP ACKs) from the application App(WiFi) and the application App(LTE) is routed to LTE interface 734 and transmitted to eNodeB 750 on the uplink over LTE link 754. The uplink IP traffic originating at the application App(WiFi), but transmitted on the uplink via LTE interface 734, is then routed back to WiFi AP 720 by LGR 752 for further transmission to the IP core network in the same manner as uplink IP packets transmitted to WiFi AP 720 over the WiFi link 722. Accordingly, the uplink IP traffic originating at the application App(WiFi), which is connected to application server 710 via the WiFi IP address, may be offloaded from the WiFi link 722 to the LTE link 754 thereby improving downlink performance on the WLAN and/or overall capacity of the communications network. It will be appreciated that the implementation of UE 780 depicted in FIG. 7 is merely an example, and that UE 780 may be implemented in any other manner suitable for providing functions of the LTE-WLAN integration capability.

Any of the various elements, components, or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. A system comprising:

a base station of a radio access network that provides User Equipment (UE) access to a core network by operating on a licensed spectrum for a carrier;

the base station includes:

a radio interface component configured to communicate with the UE through radio communications on the licensed spectrum;

a network interface component configured to directly interface with a policy control element of the core network; and a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;

the controller is configured to store the spectrum selection criteria for the UE in local memory, to start a validity timer, and to delete the spectrum selection criteria for the UE from the local memory upon expiration of the validity timer.

2. The system of claim 1 wherein:

the base station connects to at least one wireless access point that provides the UE access to the core network by operating on the unlicensed spectrum.

3. The system of claim 2 wherein:

the at least one wireless access point comprises a WiFi access point.

4. The system of claim 1 wherein:
the base station comprises an eNodeB of an Evolved Universal Terrestrial Radio Access Network (E-UTRAN).

5. The system of claim 4 wherein:
the core network comprises an Evolved Packet Core (EPC) network;
the policy control element comprises a Policy and Charging Rules Function (PCRF) of the EPC network; and
the eNodeB directly interfaces with the PCRF using a Gx interface.

6. A system comprising:
a base station of a radio access network that provides User Equipment (UE) access to a core network by operating on a licensed spectrum for a carrier;
the base station includes:
  a radio interface component configured to communicate with the UE through radio communications on the licensed spectrum;
  a network interface component configured to directly interface with a policy control element of the core network; and
  a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;
wherein:
  the policy control element comprises a Policy and Charging Rules Function (PCRF) of the core network;
  the base station directly interfaces with the PCRF using a Gx interface; and
  the Gx interface is enhanced with a Coexistence-Criteria Attribute Value Pair (AVP) for criteria used in load balancing among different spectrum carriers.

7. A system comprising:
a base station of a radio access network that provides User Equipment (UE) access to a core network by operating on a licensed spectrum for a carrier;
the base station includes:
  a radio interface component configured to communicate with the UE through radio communications on the licensed spectrum;
  a network interface component configured to directly interface with a policy control element of the core network; and
  a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;
wherein:
  the policy control element comprises a Policy and Charging Rules Function (PCRF) of the core network;
  the base station directly interfaces with the PCRF using a Gx interface; and
  the Gx interface is enhanced with a Low-Interference-Criteria Attribute Value Pair (AVP) for criteria used in selecting carriers with the lowest interference.

8. A system comprising:
a base station of a radio access network that provides User Equipment (UE) access to a core network by operating on a licensed spectrum for a carrier;
the base station includes:
  a radio interface component configured to communicate with the UE through radio communications on the licensed spectrum;
  a network interface component configured to directly interface with a policy control element of the core network; and
  a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;
wherein:
  the policy control element comprises a Policy and Charging Rules Function (PCRF) of the core network;
  the base station directly interfaces with the PCRF using a Gx interface; and
  the Gx interface is enhanced with a Traffic-Criteria Attribute Value Pair (AVP) for criteria used in allocating resources for transmissions involving the UE on the licensed spectrum and on the unlicensed spectrum based on traffic over at least one of the licensed spectrum and the unlicensed spectrum.

9. A system comprising:
a base station of a radio access network that provides User Equipment (UE) access to a core network by operating on a licensed spectrum for a carrier;
the base station includes:
  a radio interface component configured to communicate with the UE through radio communications on the licensed spectrum;
  a network interface component configured to directly interface with a policy control element of the core network; and a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;

wherein:
the policy control element comprises a Policy and Charging Rules Function (PCRF) of the core network;
the base station directly interfaces with the PCRF using a Gx interface; and
the Gx interface is enhanced with a Time-Criteria Attribute Value Pair (AVP) for criteria used in allocating resources for transmissions involving the UE on the licensed spectrum and on the unlicensed spectrum based on time of day or day of the week.

10. A system comprising:
a base station of a radio access network that provides User Equipment (UE) access to a core network by operating on a licensed spectrum for a carrier;
the base station includes:
a radio interface component configured to communicate with the UE through radio communications on the licensed spectrum;
a network interface component configured to directly interface with a policy control element of the core network; and
a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on an unlicensed spectrum, and to provide a control message including the allocated resources through the radio interface component towards the UE to enable the UE to perform the transmissions on the unlicensed spectrum, the licensed spectrum, or a combination of the unlicensed spectrum and the licensed spectrum based on the allocation;

wherein:
the policy control element comprises a Policy and Charging Rules Function (PCRF) of the core network;
the base station directly interfaces with the PCRF using a Gx interface; and
the Gx interface is enhanced with a Smart-Pricing-Criteria Attribute Value Pair (AVP) for criteria used in allocating resources for transmissions involving the UE on the licensed spectrum and on the unlicensed spectrum based on cost of transmissions over the licensed spectrum or the unlicensed spectrum.

11. A method for providing policy control for transmissions on an unlicensed spectrum with a base station of a radio access network that provides User Equipment (UE) access to a core network by operating on a licensed spectrum for a carrier, the method comprising:
transmitting a query from the base station to a policy control element of the core network requesting spectrum selection criteria for the UE, wherein the base station is configured to directly interface with the policy control element;
receiving a response from the policy control element in the base station that includes the spectrum selection criteria for the UE;
processing, at the base station, the spectrum selection criteria to allocate resources for transmissions involving the UE on the licensed spectrum and on the unlicensed spectrum;
providing a control message including the allocated resources from the base station toward the UE to enable the UE to perform the transmissions using the unlicensed spectrum, the licensed spectrum, or a combination of the unlicensed spectrum and the licensed spectrum based on the allocation;
storing the spectrum selection criteria for the UE in local memory of the base station;
starting a validity timer within the base station; and
deleting the spectrum selection criteria for the UE from the local memory upon expiration of the validity timer.

12. The method of claim 11 wherein:
the base station comprises an eNodeB of an Evolved Universal Terrestrial Radio Access Network (E-UTRAN).

13. The method of claim 12 wherein:
the core network comprises an Evolved Packet Core (EPC) network;
the policy control element comprises a Policy and Charging Rules Function (PCRF) of the EPC network; and
the eNodeB directly interfaces with the PCRF using a Gx interface.

14. The method of claim 11 wherein:
the policy control element comprises a Policy and Charging Rules Function (PCRF) of the core network;
the base station directly interfaces with the PCRF using a Gx interface; and
the Gx interface is enhanced with a Coexistence-Criteria Attribute Value Pair (AVP) for criteria used in load balancing among different spectrum carriers.

15. The method of claim 11 wherein:
the policy control element comprises a Policy and Charging Rules Function (PCRF) of the core network;
the base station directly interfaces with the PCRF using a Gx interface; and
the Gx interface is enhanced with a Low-Interference-Criteria Attribute Value Pair (AVP) for criteria used in selecting carriers with the lowest interference.

16. The method of claim 11 wherein:
the policy control element comprises a Policy and Charging Rules Function (PCRF) of the core network;
the base station directly interfaces with the PCRF using a Gx interface; and
the Gx interface is enhanced with a Traffic-Criteria Attribute Value Pair (AVP) for criteria used in allocating resources for transmissions involving the UE on the licensed spectrum and on the unlicensed spectrum based on traffic over at least one of the licensed spectrum and the unlicensed spectrum.

17. The method of claim 11 wherein:
the policy control element comprises a Policy and Charging Rules Function (PCRF) of the core network;
the base station directly interfaces with the PCRF using a Gx interface; and
the Gx interface is enhanced with a Time-Criteria Attribute Value Pair (AVP) for criteria used in allocating resources for transmissions involving the UE on the licensed spectrum and on the unlicensed spectrum based on time of day or day of the week.

18. The method of claim 11 wherein:
the policy control element comprises a Policy and Charging Rules Function (PCRF) of the core network;
the base station directly interfaces with the PCRF using a Gx interface; and
the Gx interface is enhanced with a Smart-Pricing-Criteria Attribute Value Pair (AVP) for criteria used in allocating resources for transmissions involving the UE on the licensed spectrum and on the unlicensed spectrum based on cost of transmissions over the licensed spectrum or the unlicensed spectrum.

19. A non-transitory computer readable medium embodying programmed instructions executed by a processor of a base station of a radio access network that provides User Equipment (UE) access to a core network by operating on a licensed spectrum for a carrier, wherein the instructions direct the processor to:
transmit a query, through a network interface component, to a policy control element of the core network requesting spectrum selection criteria for the UE, wherein the base station is configured to directly interface with the policy control element;
receive, through the network interface component, a response from the policy control element that includes the spectrum selection criteria for the UE;
process the spectrum selection criteria to allocate resources for transmissions involving the UE on the licensed spectrum and on an unlicensed spectrum;
provide a control message including the allocated resources through a radio interface component towards the UE to enable the UE to perform the transmissions on the unlicensed spectrum, the licensed spectrum, or a combination of the unlicensed spectrum and the licensed spectrum based on the allocation;
store the spectrum selection criteria for the UE in local memory;
start a validity timer; and
delete the spectrum selection criteria for the UE from the local memory upon expiration of the validity timer.

20. The computer readable medium of claim 19 wherein:
the base station connects to at least one wireless access point that provides the UE access to the core network by operating on the unlicensed spectrum.

21. The computer readable medium of claim 20 wherein:
the at least one wireless access point comprises a WiFi access point.

22. The computer readable medium of claim 19 wherein:
the base station comprises an eNodeB of an Evolved Universal Terrestrial Radio Access Network (E-UTRAN).

23. The computer readable medium of claim 19 wherein:
the policy control element comprises a Policy and Charging Rules Function (PCRF) of the core network; and
the base station directly interfaces with the PCRF using a Gx interface.

24. A system comprising:
a base station comprising:
a first radio interface component configured to communicate with User Equipment (UE) through radio communications on a licensed spectrum for a carrier to provide the UE access to a core network;
a second radio interface component configured to communicate with the UE through radio communications on an unlicensed spectrum to provide the UE access to the core network;
a network interface component configured to directly interface with a policy control element of the core network; and
a controller configured to transmit a query to the policy control element through the network interface component requesting spectrum selection criteria for the UE, to receive a response from the policy control element through the network interface component that includes the spectrum selection criteria for the UE, to process the spectrum selection criteria to allocate resources for transmissions involving the UE on the licensed spectrum and on the unlicensed spectrum, and to provide a control message including the allocated resources through one of the first radio interface component or the second radio interface component towards the UE to enable the UE to perform the transmissions using the unlicensed spectrum, the licensed spectrum, or a combination of the unlicensed spectrum and the licensed spectrum based on the allocation;
the controller is configured to store the spectrum selection criteria for the UE in local memory, to start a validity timer, and to delete the spectrum selection criteria for the UE from the local memory upon expiration of the validity timer.

25. The system of claim 24 wherein:
the base station comprises an eNodeB of an Evolved Universal Terrestrial Radio Access Network (E-UTRAN).

26. The system of claim 24 wherein:
the policy control element comprises a Policy and Charging Rules Function (PCRF) of the core network; and
the base station directly interfaces with the PCRF using a Gx interface.

* * * * *